J. P. BROPHY.
NOISELESS CAR WHEEL.
APPLICATION FILED DEC. 6, 1917.

1,257,974.   Patented Mar. 5, 1918.

INVENTOR
John P. Brophy
BY Jay, Oberlin & Jay
ATTORNEYS

UNITED STATES PATENT OFFICE.

JOHN P. BROPHY, OF CLEVELAND HEIGHTS, OHIO.

NOISELESS CAR-WHEEL.

1,257,974.      Specification of Letters Patent.      Patented Mar. 5, 1918.

Application filed December 6, 1917. Serial No. 205,731.

*To all whom it may concern:*

Be it known that I, JOHN P. BROPHY, a citizen of the United States, and a resident of Cleveland Heights, county of Cuyahoga, and State of Ohio, have invented a new and useful Improvement in Noiseless Car-Wheels, of which the following is a specification, the principle of the invention being herein explained and the best mode in which I have contemplated applying that principle, so as to distinguish it from other inventions.

The present invention, relating, as indicated, to noiseless car wheels, is concerned with the construction of a wheel for use on steam or electric cars and engines and for other purposes, in which the axle or bearings are insulated from the tread portion in order to avoid the transmission of vibrations to the axle and to the body of the vehicle. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Figure 1:
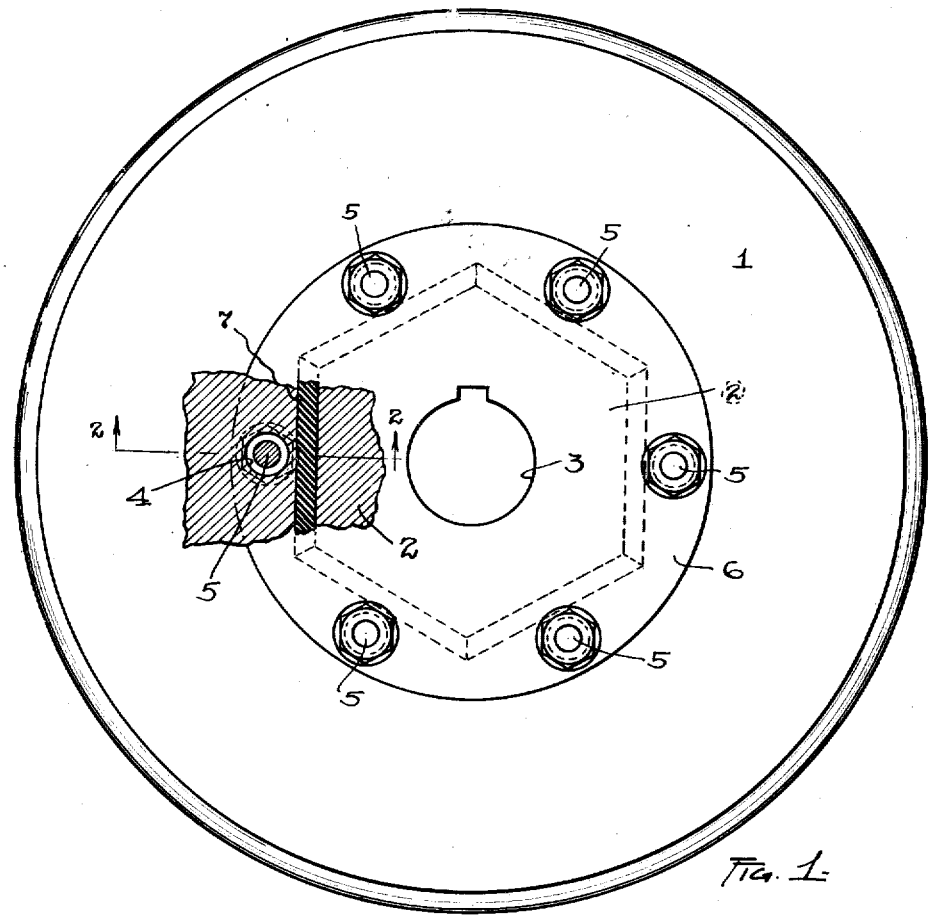
Figure 2:
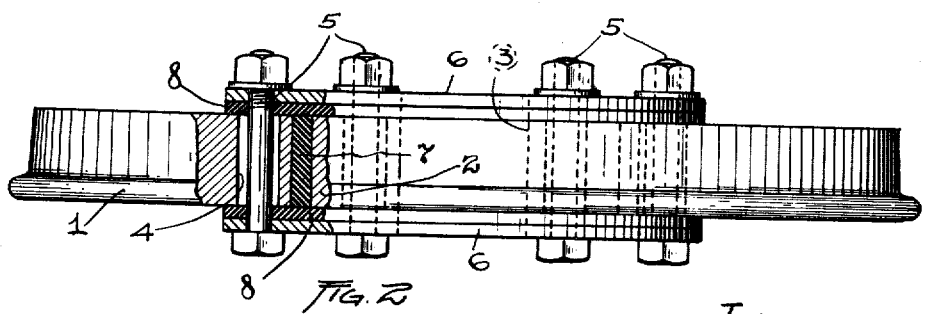

Figure 1 is a side elevation of my improved car wheel, a portion being shown in section; and Fig. 2 is a top plan view of the same, a portion being shown in section, the plane of the section being that of 2—2, Fig. 1.

My improved wheel consists of an outer tread portion 1 and an inner hub or axle-receiving portion 2. These two portions of the wheel are preferably of metal, as is customary, the inner member 2 being suitably apertured, as at 3, to permit of the insertion of an axle or bearing members. The inner wheel of the outer tread member 1 and the outer wall of the inner hub member 2 are symmetrically irregular and are spaced from each other. By symmetrically irregular I mean that these two surfaces are not circles concentric with the outer surface or tread of the member 1, and I have shown for illustration these two inner surfaces as six-sided, with the various sides equal in length and in their relation to the center of the wheel. It will be evident, however, that these two surfaces may be of other shapes so long as they are irregular with respect to a circle passing between the same, in order to secure a positive driving engagement between the inner and outer members through the means to be presently described.

Disposed at suitable intervals adjacent to the inner surface of the tread member 1 are a series of apertures 4, each of which extends through the tread member from side to side, and through which may be passed bolt members 5. The openings 4 are larger than the bolts 5 so that the bolts when in position do not contact the metallic tread member at any point. Formed integral with the inner member 2, or attached thereto, as may be desired, are exterior plates or flange members 6 which extend over the inner edges of the outer tread member 1 past the bolt holes 4. These plates or flanges 6 are spaced a certain distance from the sides of the tread member 1 and the bolts 5 are passed through suitable apertures in these flanges or plates.

Disposed between the inner surface of the tread member and the outer surfaces of the hub member is non-metallic insulating material 7 which completely fills this space and affords a positive driving connection between these two members by reason of the irregularity of contour of the inner and outer faces of the tread and hub members respectively. Between the flanges 6 and the tread and hub members 1 and 2 is disposed other non-metallic insulating material 8, suitably apertured to permit of the passage therethrough of the bolts 5 and serving to insulate the tread member from any actual contact with the hub member through the flanges 6. It will of course be seen that there is contact between the connecting bolts 5 and the flanges 6, but no vibration can be transmitted through this bolt since the bolt itself is not in contact at any point with the tread member.

As shown in the drawings the insulating material 8 is in the form of plates mounted beneath the plates 6, which are not attached to the hub member, but are separate therefrom, although if desired these plates may be formed integral with the hubs and recesses may be formed between the flanges 6 and the hub proper, within which may be mounted the insulating plates 8. My improved wheel prevents the transmission of any vibration from the tread member to the hub member, and yet affords a secure and positive driving engagement between these two members, and none of the driving strain is carried by the connecting bolts which clamp the inclosing plates against the hub members.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a car wheel, the combination of an outer metallic tread member, an inner metallic hub-receiving member, non-metallic insulating material interposed between said tread and hub members and snugly filling the space therebetween, and means adapted to maintain said members and said insulating material in engagement, said means being also insulated from said tread and hub members.

2. In a car wheel, the combination of an outer metallic tread member, an inner metallic hub-receiving member, said members being symmetrically irregular, insulating material interposed between said members and snugly filling the space therebetween and serving as a driving means between said members, and means adapted to maintain said members and insulating material in engagement, said means being also insulated from said tread and hub members.

3. In a car wheel, the combination of an outer metallic tread member, an inner metallic hub-receiving member spaced from the inner wall of said tread member, the inner wall of said outer member and the outer wall of said inner member being symmetrically irregular and said outer member having openings therethrough adjacent its inner surface, non-metallic plates mounted against the sides of said members overlapping such openings, metallic plates mounted on the outer sides of said non-metallic plates, bolts passing through openings without contact with the sides thereof and engaging said metallic and non-metallic plates and other non-metallic insulating materia interposed between said inner and outer members and snugly filling the space there between.

Signed by me, this 30 day of November 1917.

JOHN P. BROPHY.